United States Patent
Hirai et al.

[11] Patent Number: 5,969,869
[45] Date of Patent: Oct. 19, 1999

[54] PRISM

[75] Inventors: Isamu Hirai; Etsuro Nishio; Yutaka Kamijo, all of Tokyo, Japan

[73] Assignee: Asahi Kogaku Kogyo Kabushiki Kaisha, Tokyo, Japan

[21] Appl. No.: 08/957,745

[22] Filed: Oct. 24, 1997

[30] Foreign Application Priority Data

Oct. 25, 1996 [JP] Japan .................................. 8-301331

[51] Int. Cl.$^6$ .............................. G02B 5/02; G02B 5/04; G02B 27/00
[52] U.S. Cl. .......................... 359/599; 359/601; 359/614; 359/831; 359/836
[58] Field of Search .................................. 359/831, 833, 359/834, 835, 836, 837, 599, 601, 614; 396/384, FOR 859

[56] References Cited

U.S. PATENT DOCUMENTS

| | | | |
|---|---|---|---|
| 3,094,911 | 6/1963 | Reiche et al. | 396/384 |
| 3,687,038 | 8/1972 | Kawakami | 359/834 |
| 3,800,655 | 4/1974 | Uchida | 396/384 |
| 3,840,298 | 10/1974 | Okuno | 396/384 |
| 3,962,710 | 6/1976 | Okuno et al. | |
| 4,021,830 | 5/1977 | Kanno | |
| 4,134,652 | 1/1979 | Kiyohara et al. | |
| 4,297,020 | 10/1981 | Yamada et al. | 396/384 |
| 4,332,446 | 6/1982 | Okuno | 396/384 |
| 4,376,575 | 3/1983 | Someya et al. | |
| 4,422,722 | 12/1983 | Higuchi et al. | 359/831 |
| 4,560,264 | 12/1985 | Kitazawa et al. | |
| 5,119,124 | 6/1992 | Ito et al. | |
| 5,250,969 | 10/1993 | Abe et al. | |
| 5,526,083 | 6/1996 | Misawa | |

*Primary Examiner*—Ricky D. Shafer
*Attorney, Agent, or Firm*—Greenblum & Bernstein P.L.C.

[57] ABSTRACT

A prism has a notch at a lower end of a third reflection plane of a pentagonal roof prism. The notch has a frosted wall, on which a transparent plate is adhered with adhesive. A miniature prism is adhered to the transparent plate with adhesive. The adhesive has photo-transmissibility, so that a transparent plane is formed between the pentagonal prism, the transparent plate and the miniature prism. Information displayed by an indication device is directed to an eyepiece optical system, via a mirror and the miniature prism.

18 Claims, 4 Drawing Sheets

10

PRISM

BACKGROUND OF THE INVENTION

1. Field of the Invention

The present invention relates to a pentagonal roof prism mounted in a single reflex camera, and more particularly to an improvement of a structure of an optical system provided for indicating information within a viewfinder.

2. Description of the Related Art

Conventionally, there is known an optical system in which a miniature prism is applied to a surface of a pentagonal roof prism, so that information indicated by an indicating device, such as a liquid crystal display, is directed to a viewfinder by the miniature prism. Namely, a light beam corresponding to the indicated information is reflected, by the miniature prism, into the viewfinder, so that information, such as a shutter speed, is indicated within the viewfinder, but outside the frame of an object image.

In such a device, however, stray light, which enters from outside the pentagonal roof prism and becomes internally incident on a surface to which the miniature prism is applied, is reflected by an inner plane of the pentagonal roof prism and is directed to the viewfinder. This stray light causes an outside portion of the frame of the object image, formed in the viewfinder, to fade or become discolored, and thus, viewing of the information, such as shutter speed, by the photographer would become difficult.

SUMMARY OF THE INVENTION

Therefore, an object of the invention is to provide a prism by which the stray light is prevented from entering the viewfinder, so that the indication within the viewfinder becomes clear.

According to the present invention, there is provided a prism mounted in an optical device, comprising a main prism and a sub-prism. The main prism has a notch which is recessed relative to a surface adjacent thereto. The notch has an attaching wall which is frosted. The sub-prism is adhered to the attaching wall with adhesive having photo-transmissibility, the sub-prism being smaller than the main prism.

Further, according to the present invention, there is provided a pentagonal roof prism for a viewfinder optical system provided in a single reflex camera, comprising an incident surface into which a light beam enters, a notch formed along a side of the incident surface, and a sub-prism. The notch has an attaching wall which is frosted. The sub-prism is adhered to the attaching wall with adhesive having photo-transmissibility.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
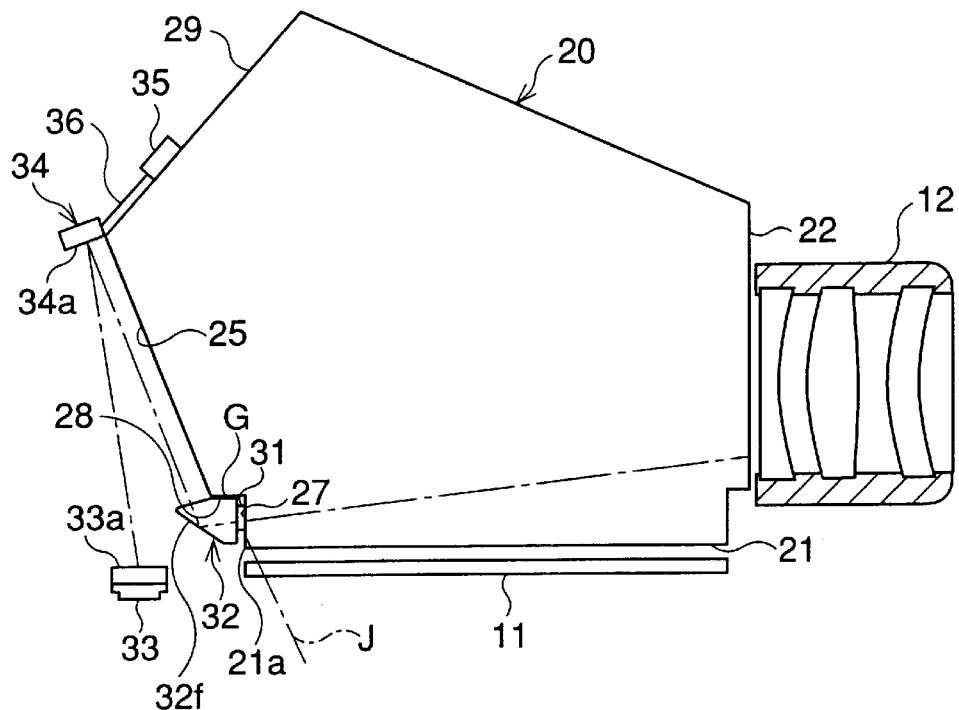
FIG. 1 is a partially sectional view showing a pentagonal roof prism and a construction around the pentagonal roof prism, to which embodiment of the present invention is applied.

The present invention will be described below with reference to embodiments shown in the drawings.

FIG. 1 shows a pentagonal roof prism 20 mounted in a viewfinder optical system of a single reflex camera to which an embodiment of the present invention is applied. This prism is made of glass.

An under surface of the pentagonal roof prism (i.e. main prism) 20 is an incident surface 21 into which a light beam enters, and a rear surface of the pentagonal roof prism 20 is an emergent surface 22 from which the light beam emerges. A focusing glass 11 faces the incident surface 21, and an eyepiece optical system 12 faces the emergent surface 22. An object image obtained through a photographing optical system (not shown) is formed on the focusing glass 11. Light passing through the focusing glass 11 is reflected by a reflection plane of the pentagonal roof prism 20, and enters the eyepiece optical system 12 after emerging from the emergent surface 22.

As shown in FIGS. 2 through 5, a notch 26 is formed adjacent to the incident surface 21, on a lower portion of a third reflection plane 25, and is extended along a side 21a of the incident surface 21. Namely, the notch 26 is recessed relative to the third reflection plane 25. The notch 26 has a first wall (i.e. an attaching wall) 27 and a second wall (i.e. a non-attaching wall) 28 which are perpendicular to each other. The first wall 27 is approximately perpendicular to the incident surface 21, and the second wall 28 is approximately parallel to the incident surface 21. The walls 27 and 28 are frosted and are not polished.

Figure 2:
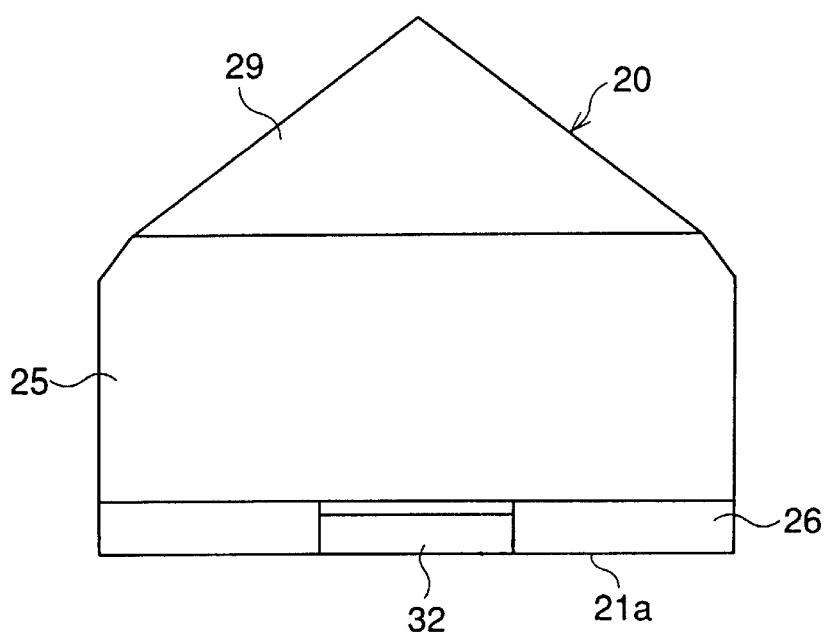
FIG. 2 is a front view showing the pentagonal prism.
Figure 3:
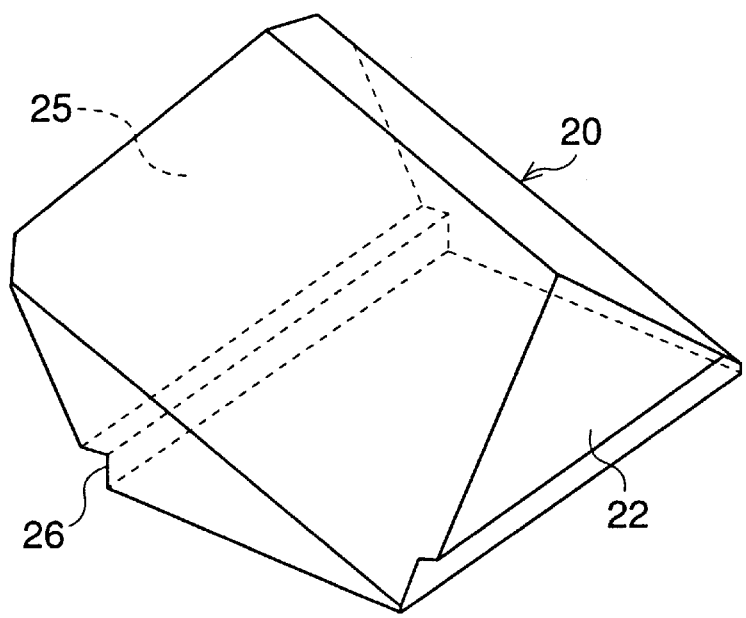
FIG. 3 is a perspective view showing the pentagonal prism viewed obliquely from an upper side thereof.
Figure 4:
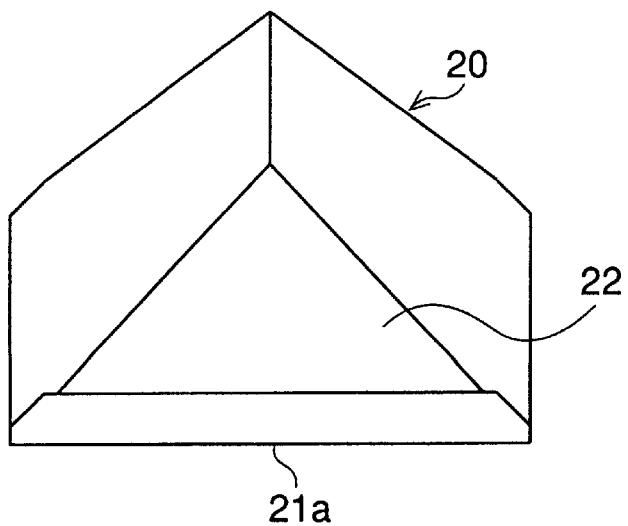
FIG. 4 is a rear view showing the pentagonal prism.
Figure 5:
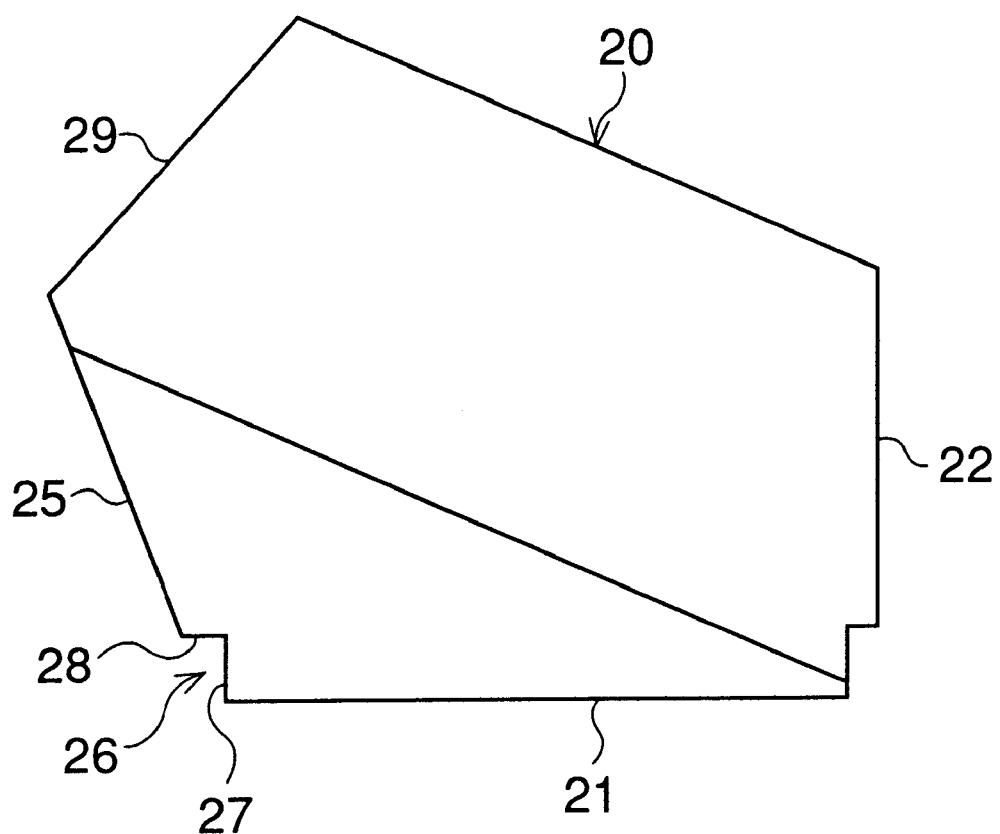
FIG. 5 is a side view showing the pentagonal prism.

A transparent plate 31 made of glass is adhered to a part of the first wall 27 with adhesive, and a miniature prism (i.e. sub-prism) 32 is adhered to the transparent plate 31 with adhesive. As shown in FIG. 2, the length of the miniature prism 32 is shorter than that of the notch 26, the lengths being parallel to both the first wall 27 and the incident surface 21. A front part 32f of the miniature prism 32 projects beyond the third reflection plane 25. The adhesive adhering the transparent plate 31 to both the first wall 27 and the miniature prism 32 has photo-transmissibility which allows light to pass therethrough. Namely, surfaces at which the miniature prism 32 and the transparent plate 31 are connected with each other, and surfaces at which the transparent plate 31 and the pentagonal roof prism 20 are connected with each other, are transparent planes.

Note that it is preferable that the adhesive is not substantially shrunk when hardening. A gap G is formed between the miniature prism 32 and the second wall 28, the second wall 28 being covered with an opaque, black coating.

An indication device 33 having a liquid crystal display is provided at a predetermined position in the camera. Information indicating an operating condition of the camera, such as a shutter speed, is indicated on a surface 33a of the indication device 33, in accordance with a signal from the control circuit (not shown). The surface 33a of the indication device 33 faces a reflection surface 34a of a mirror 34 provided at an upper end of the third reflection plane 25. The reflection surface 34a is slightly inclined with respect to the surface 33a of the indication device 33, so that a light beam coming from the indication device 33 is reflected to the front part 32f of the miniature prism 32. Namely, the mirror 34 faces both the indication device 33 and the miniature prism 32.

Thus, an image indicated by the indication device 33 is directed to the eyepiece optical system 12 by being reflected via the mirror 34 and a mirror plane 32g of the miniature prism 32, so that the information, such as the shutter speed, can be observed within the viewfinder, but outside the frame of the object image. Note, that a coating may be applied on an outer surface of the miniature prism 32 in order to form the mirror plane 32g.

The mirror 34 is connected to a connecting plate 36, which is connected to a fixed member 35 attached to an upper wall 29, which is adjacent to an upper side of the third reflection plane 25. Thus, the mirror 34 is positioned at the upper end of the third reflection plane 25.

Figure 6:
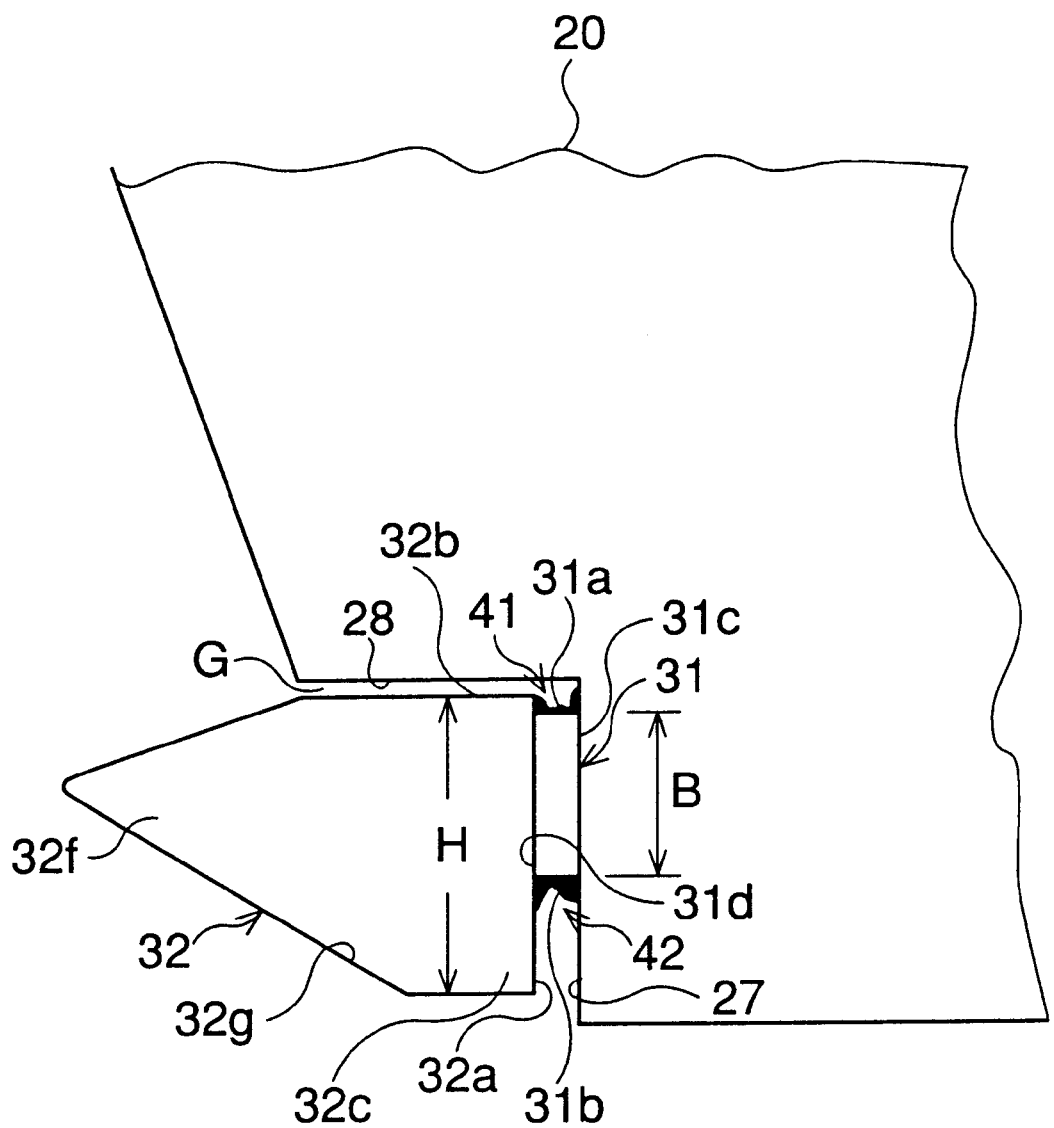
FIG. 6 is an expanded side view showing a construction in which a sub-prism is adhered to the pentagonal roof prism, via the interposition of a transparent plate.

FIG. 6 shows an enlargement of a construction in which the miniature prism 32 is adhered to the pentagonal roof prism 20, with the transparent plate 31 interposed between the two. The transparent plate 31 has first and second surfaces 31c and 31d, which are adhered to the pentagonal roof prism 20 and the miniature prism 32, respectively. The first and second surfaces 31c and 31d are parallel to each other.

The height H of an adhered surface 32a of the miniature prism 32 is shorter than the perpendicular distance between the second wall 28 and the incident surface 21. The breadth B of the transparent plate 31 is, for example, approximately 60% of the height H of an adhered surface 32a of the miniature prism 32. An upper edge 31a of the transparent plate 31 is positioned below an upper surface 32b of the miniature prism 32. Accordingly, a first groove 41 is formed by the combination of the adhered surface 32a of the miniature prism 32, the first wall 27 and the upper edge 31a of the transparent plate 31, and a second groove 42 is formed by the combination of the adhered surface 32a, the first wall 27 and a lower edge 31b of the transparent plate 31. Due to these grooves 41 and 42, the adhesive is retained in the vicinity of the adhering surfaces while hardening occurs.

As described above, in the embodiment, the notch 26 is formed by the frosted walls 27 and 28, at the lower end portion of the third reflection plane 25 of the pentagonal roof prism 20. The miniature prism 32 is then adhered to the first wall 27 so that the information displayed by the indication device 33 is directed to the eyepiece optical system 12. Due to the notch 26, a ray of stray light J (shown in FIG. 1) entering the pentagonal roof prism 20 is partly reflected around the inside of the miniature prism 32, so that the stray light is directed to a portion other than the viewfinder. Further rays of stray light, not being incident on the boundary surface of the transparent plate 31, are diffused by the first wall 27 Stray light being incident on the opaque, black second wall 28, is absorbed. Therefore, the outside of the frame of the object image within the viewfinder remains dark, so that the information, such as a shutter speed, is clearly indicated in the viewfinder.

Further, in the embodiment, since the miniature prism 32 is positioned in the notch 26, the angle of a corner 32c of the miniature prism 32 can be enlarged, in comparison with a construction in which the miniature prism 32 is adhered directly to the third plane 25, for example. Therefore, cracks, which form due to a high grinding sensitivity, are prevented from being generated in the corner 32c of the miniature prism 32.

Furthermore, in the embodiment, the transparent plate 31, adhered between the miniature prism 32 and the first wall 27, is smaller than the adhered surface 32a of the miniature prism 32, and thus, the size of the miniature prism 32 can be manufactured larger and can have a simpler shape, in comparison with a construction in which the miniature prism 32 is directly adhered to a conventional pentagonal roof prism. Also, the manufacturing process of the miniature prism 32 is less complex, and thus the manufacturing cost can be reduced. Further, an effective frame, substantially used for indicating the information within the viewfinder, is coincident with the surface of the transparent plate 31. Therefore, by setting a position where the transparent plate 31 is adhered, the position of the indication within the viewfinder can be determined with a high accuracy.

Also, since the grooves 41 and 42 are formed by providing the transparent plate 31, liquid adhesive can be hold in a portion between the first wall 27 and the miniature prism 32, and thus, the adhering operation of the miniature prism 31 becomes less complicated.

Note that the miniature prism 32 and the transparent plate 31 can be made of synthetic resins. In this case, by forming the miniature prism 32 and the transparent plate 31 as one body, the manufacturing cost can be further reduced.

Also note that the present invention is not restricted to a prism having a specific shape, although the pentagonal roof prism 20 is utilized in the embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-301331 (filed on Oct. 25, 1996) which is expressly incorporated herein by reference, in its entirety.

We claim:

1. A prism mounted in an optical device, comprising:
    a main prism having a notch which is recessed relative to a surface adjacent thereto, said notch having an attaching wall which is frosted, said notch having a non-attaching wall other than said attaching wall, and said non-attaching wall is also frosted; and
    a sub-prism adhered to said attaching wall with adhesive having photo-transmissibility, said sub-prism being smaller than said main prism, and wherein said attaching wall, said non-attaching wall, and said sub-prism are constructed and arranged such that stray light incident on the non-attaching wall is scattered.

2. A prism according to claim 1, wherein said main prism is made of glass.

3. A prism according to claim 1, wherein said main prism has an incident surface into which a light beam enters and which is adjacent to said notch, said notch being extended along a side of said incident surface.

4. A prism according to claim 1, wherein said main prism has a reflection surface which is adjacent to said notch, and said sub-prism has a tip portion projecting beyond a plane of said reflection surface.

5. A prism according to claim 1, wherein said adhesive is not substantially shrunk when hardening.

6. A prism according to claim 1, wherein said non-attaching wall having an opaque coating.

7. A prism according to claim 6, wherein said attaching wall and said non-attaching wall are perpendicular to each other.

8. A prism according to claim 1, further comprising a transparent plate between said main prism and said sub-prism.

9. A prism according to claim 8, wherein said transparent plate has first and second surfaces which are adhered to said main prism and said sub-prism, respectively, said first and second surfaces being parallel to each other.

10. A prism according to claim 8, wherein said transparent plate and said sub-prism are made of synthetic resin, and are formed as one body.

11. A prism according to claim 8, wherein said attaching wall, an edge of said transparent plate and said sub-prism form a groove.

12. A prism according to claim 1, wherein said main prism is provided in a viewfinder optical system of a camera.

13. A prism according to claim 1, wherein said main prism is a pentagonal roof prism.

14. A pentagonal roof prism for a viewfinder optical system provided in a single reflex camera, comprising:

an incident surface into which a light beam enters;

a notch formed along a side of said incident surface, said notch having an attaching wall which is frosted, said notch having a non-attaching wall other than said attaching wall, and said non-attaching wall is also frosted; and a sub-prism adhered to said attaching wall with adhesive having photo-transmissibility, and wherein said attaching wall, said non-attaching wall, and said sub-prism are constructed and arranged such that stray light incident on the non-attaching wall is scattered, so that information is clearly indicated in the viewfinder.

15. A pentagonal roof prism according to claim 14, further comprising a transparent plate between said pentagonal roof prism and said sub-prism.

16. A pentagonal roof prism according to claim 15, wherein said sub-prism has an adhered surface to which a surface of said transparent plate is adhered, said transparent plate being smaller than said adhered surface.

17. A pentagonal roof prism according to claim 16, wherein information indicated through said viewfinder optical system is coincident with said surface of said transparent plate.

18. A prism mounted in an optical device, comprising:

a main prism having a notch which is recessed relative to a surface adjacent thereto, said notch having an attaching wall which is frosted;

a sub-prism adhered to said attaching wall with adhesive having photo-transmissibility, said sub-prism being smaller than said main prism; and a transparent plate between said main prism and said sub-prism.

* * * * *